United States Patent
Elkins, II et al.

(10) Patent No.: US 6,856,748 B1
(45) Date of Patent: Feb. 15, 2005

(54) INTERCONNECTION ENCLOSURE HAVING A CONNECTOR PORT AND PRETERMINATED OPTICAL CONNECTOR

(75) Inventors: Robert B. Elkins, II, Hickory, NC (US); James P. Luther, Hickory, NC (US); Lars K. Nielsen, Denver, NC (US); Otto I. Szentesi, Hickory, NC (US); Hieu V. Tran, Charlotte, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/674,696

(22) Filed: Sep. 30, 2003

(51) Int. Cl.⁷ .............................. G02B 6/00; G02B 6/44
(52) U.S. Cl. .................. 385/135; 385/136; 385/100
(58) Field of Search ................. 385/135, 136, 385/100, 53, 55, 76, 112

(56) References Cited

U.S. PATENT DOCUMENTS

| | | | |
|---|---|---|---|
| 4,961,623 A | 10/1990 | Midkiff et al. | 350/96.2 |
| 4,978,086 A * | 12/1990 | Spicer | 242/378 |
| 5,042,901 A | 8/1991 | Merriken et al. | 385/135 |
| 5,121,458 A | 6/1992 | Nilsson et al. | 385/100 |
| 5,125,060 A | 6/1992 | Edmundson | 385/100 |
| 5,133,032 A * | 7/1992 | Salter et al. | 385/60 |
| 5,210,812 A | 5/1993 | Nilsson et al. | 385/100 |
| 5,440,665 A | 8/1995 | Ray et al. | 385/135 |
| 5,528,718 A | 6/1996 | Ray et al. | 385/136 |
| 5,696,864 A * | 12/1997 | Smith et al. | 385/135 |
| 5,742,718 A * | 4/1998 | Harman et al. | 385/53 |
| 5,778,122 A | 7/1998 | Giebel et al. | 385/55 |
| 5,892,870 A | 4/1999 | Fingler et al. | 385/59 |
| RE37,028 E | 1/2001 | Cooke et al. | 385/112 |
| 6,579,014 B2 | 6/2003 | Melton et al. | 385/76 |

* cited by examiner

Primary Examiner—Chandrika Prasad

(57) ABSTRACT

An interconnection enclosure comprising at least one connector port operable for receiving a connector pair and a preterminated optical connector received in the at least one connector port, wherein the preterminated optical connector is adapted to be withdrawn from the exterior of the enclosure without entering the enclosure. The enclosure further comprising a tether means, a bend radius control means and a sealing means. An interconnection enclosure comprised of two halves held together by a fastening means, the enclosure defining an end wall and defining at least one connector port opening through the end wall for receiving a preterminated optical connector, the enclosure housing further defining an opening for receiving a distribution cable extending therethrough, wherein the preterminated optical connector is adapted to be withdrawn from the exterior of the enclosure without entering the enclosure.

16 Claims, 11 Drawing Sheets

INTERCONNECTION ENCLOSURE HAVING A CONNECTOR PORT AND PRETERMINATED OPTICAL CONNECTOR

BACKGROUND OF THE INVENTION

1. Field of the Invention

The present invention relates generally to an enclosure for interconnecting preterminated optical fibers, and more specifically, to an enclosure having at least one connector port and at least one preterminated fiber optic connector that provides access to the preterminated connectors from the exterior of the enclosure.

2. Description of the Related Art

Optical fiber cable is used for a variety of applications including voice communications, data transmission and the like. As a result of the increase in demand, fiber optic networks typically include an ever-increasing number of access points in which one or more optical fibers are branched from a distribution cable. These access points provide an increase in the number of connections in a given area and may be used to supply "fiber-to-the-premises" (FTTP). Based on the increase in the number of access points, and based on the unique physical needs of the optical fibers themselves, an enclosure is needed for protecting, handling, connecting and maintaining the optical fibers and their respective connectors. The enclosure should provide protection of the access point, the branched fibers and the connectors from environmental and mechanical factors, such as weather and stress.

Branching a distribution cable may involve branching and/or splicing one or more optical fibers that make up the cable. Distribution cables may range in length from meter to kilometer lengths, and may comprise a plurality of access points located at predetermined positions along their length. Drop cables, typically smaller than distribution cables, may be routed from the distribution cable to predetermined locations, such as a "network interface device" (NID) or a "network access point" (NAP). In various conventional drop cable designs, a technician may be responsible for accessing and splicing specific optical fibers of a distribution cable in the field. This costly and time consuming process requires sending a technician to the site, removing a portion of the cable sheath at a predetermined location, locating the appropriate optical fibers, cutting the appropriate optical fibers, branching and/or splicing the optical fibers to a drop cable optical fiber and installing an enclosure. In addition, conventional designs typically include a splice tray mounted within the enclosure for handling the splice point and storing slack cable. Using these conventional designs, if it is desired to service or alter the splice point, or to branch an additional optical fiber at the same access point, the enclosure must be opened and entered.

Optical fibers that have been accessed from a distribution cable must be protected from mechanical stresses, such as bending and tensile forces. A minimum bend radius, such as about 1.50 inches, must be maintained in order to properly transmit light through the core of the optical fiber. Too great a tensile force applied to an optical fiber, such as that applied by the weight of a drop cable or environmental factor, may damage the drop cable, splice point, distribution cable and other branched optical fibers. Conventional enclosure design does not adequately provide for bend radius control and fiber travel limitation. More importantly, conventional enclosure design does not allow access to the optical fibers from the exterior of the enclosure, while still providing for bend radius and travel control. In optical fiber enclosures, it is often necessary to clean or service the connectors. To do this, it is necessary to remove some quantity of optical fiber length from the enclosure. If too much length is pulled, two problems may occur: The first is that the optical fiber within the enclosure may be pulled around a tight corner or bend, exceeding the bend radius of the fiber and causing damage. The second is that the fiber may be damaged while pushing it back into the enclosure. Conventional enclosure design requires that special care be taken to not exceed the minimum bend radius when opening an enclosure to access the optical fibers contained therein. Thus, conventional enclosure design requires that a field technician spend extra time and effort to ensure that the optical fiber integrity is not compromised during cleaning and servicing procedures.

What is desired is an enclosure that allows for damage-free fiber slack removal and replacement during connector cleaning and servicing. Further, what is desired is a manufactured preterminated optical fiber cable comprising a plurality of factory or field-installed enclosures located at predetermined positions along the cable length, wherein the enclosure architecture allows access to preterminated connectors from the exterior of the enclosure. What is further desired is an enclosure comprising at least one connector port that provides access to preconnectorized optical fibers, which will lead to rapid and low-cost drop cable installation. The enclosure should be capable of handling and protecting the optical fibers and their respective connectors, provide for bend radius control of the optical fibers and allow access to the connectors for cleaning and servicing from the exterior of the enclosure. Thus, there is a need in the art for an enclosure that eliminates the need for the field splicing of drop cables, and eliminates the need for a field technician to have to open and enter the interior of the enclosure to clean, service and gain access to preterminated connectors, which may disturb and damage the contents of the enclosure.

BRIEF SUMMARY OF THE INVENTION

To achieve the foregoing and other objects, and in accordance with the purpose of the present invention as embodied and broadly described herein, the present invention provides various embodiments of optical fiber interconnection enclosures having a connector port and preterminated connectors that may be withdrawn and reloaded from the exterior of the enclosure without entering the interior of the enclosure. In various embodiments, the present invention describes factory and field-installed interconnection enclosures. In various embodiments, the present invention also describes apparatus within the enclosure that prevent fiber over-travel while maintaining bend radius control, reducing the risk of damaging the optical fibers and their respective connectors during cleaning and servicing procedures. The enclosures described below may be used to handle and protect spliced/spliceless optical fibers that are preterminated at various predetermined positions along the length of a fiber optic cable.

In various embodiments, the present invention describes an interconnection enclosure comprising at least one connector port operable for receiving a connector pair and a preterminated connector received in the at least one connector port. The preterminated connector is accessed from the exterior of the enclosure without entering the enclosure, thus providing access to the ferrule and the connector for cleaning and servicing. In other embodiments, the enclosure further comprises a tether means within the enclosure housing operable for limiting an extension distance of the preterminated connectors exterior of the enclosure. In a further embodiment, the termination enclosure comprises a bend radius control means for handling and maintaining a minimum bend radius of the preterminated optical fibers within the enclosure housing. In still further embodiments, a sealing means, such as an invertable rubber boot, is operable for sealing the at least one connector port from the environment exterior of the enclosure when a preterminated connector is engaged with its respective connector port. The invertable rubber boot may further provide a tether function for the optical fibers.

In a still further embodiment, the present invention describes an interconnection enclosure comprised of two portions held together by a fastening means, the enclosure housing defining end walls and defining at least one connector port opening through at least one of the end walls for receiving a preterminated connector, the enclosure housing further defining an opening for receiving a distribution cable extending therethrough. The enclosure architecture allows for a preterminated connector branched from a distribution cable to be accessed from the exterior of the enclosure. The enclosure may further comprise a tether means within the enclosure operable for limiting an extension distance of the preterminated connector exterior of the enclosure, and a sealing means within the enclosure operable for sealing the at least one connector port when the preterminated connector is engaged with the connector port. The enclosure may further comprise a bend radius control means for maintaining a minimum bend radius of the optical fibers. The interconnection enclosure may be factory or field-installed.

In a still further embodiment, the present invention describes a preterminated fiber optic connection comprising an access point located at a predetermined position on a distribution cable, at least one optical fiber of the distribution cable accessed via the access point, a closure housing forming a cavity therein and defining a passage for the distribution cable extending therethrough, at least one connector port, a tethering means and a sealing means. The preterminated connector may be accessed from the exterior of the enclosure via the connector port without opening or entering the enclosure.

BRIEF DESCRIPTION OF THE DRAWINGS

These and other features, aspects and advantages of the present invention are better understood when the following detailed description of the invention is read with reference to the accompanying drawings, wherein.

DETAILED DESCRIPTION OF THE INVENTION

The present invention will now be described more fully hereinafter with reference to the accompanying drawings in which preferred embodiments of the invention are shown. This invention may, however, be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

The present invention provides various embodiments of factory- and field-installed interconnection enclosures having at least one connector port through which preterminated optical connectors are accessible from the exterior of the enclosure without having to open or enter the enclosure. The various embodiments of the present invention may be applied in a "fiber-to-the-premises" (FTTP) termination system, or in any other termination system in which is it desired to access optical fibers of a distribution cable. Throughout the specification, the term "enclosure" is intended to included all types of enclosures including, but not limited to, aerial closures, splice closures, buried enclosures and wall-mounted enclosures. Throughout the specification, the term "distribution cable" is intended to include all types of optical fiber cables comprising a plurality of optical fibers within a sheath including, but not limited to loose tube, tight buffered and monotube designs. Preconnectorized drop cables may be connected to, and disconnected from, the preterminated connectors at the connector ports from the exterior of the enclosure, thus eliminating the need for opening or entering the enclosure to access the preterminated connectors. Further, the present invention eliminates the need for fusion and mechanical splicing in the field for the purpose of branching optical fibers along the length of a distribution cable.

Figure 1:
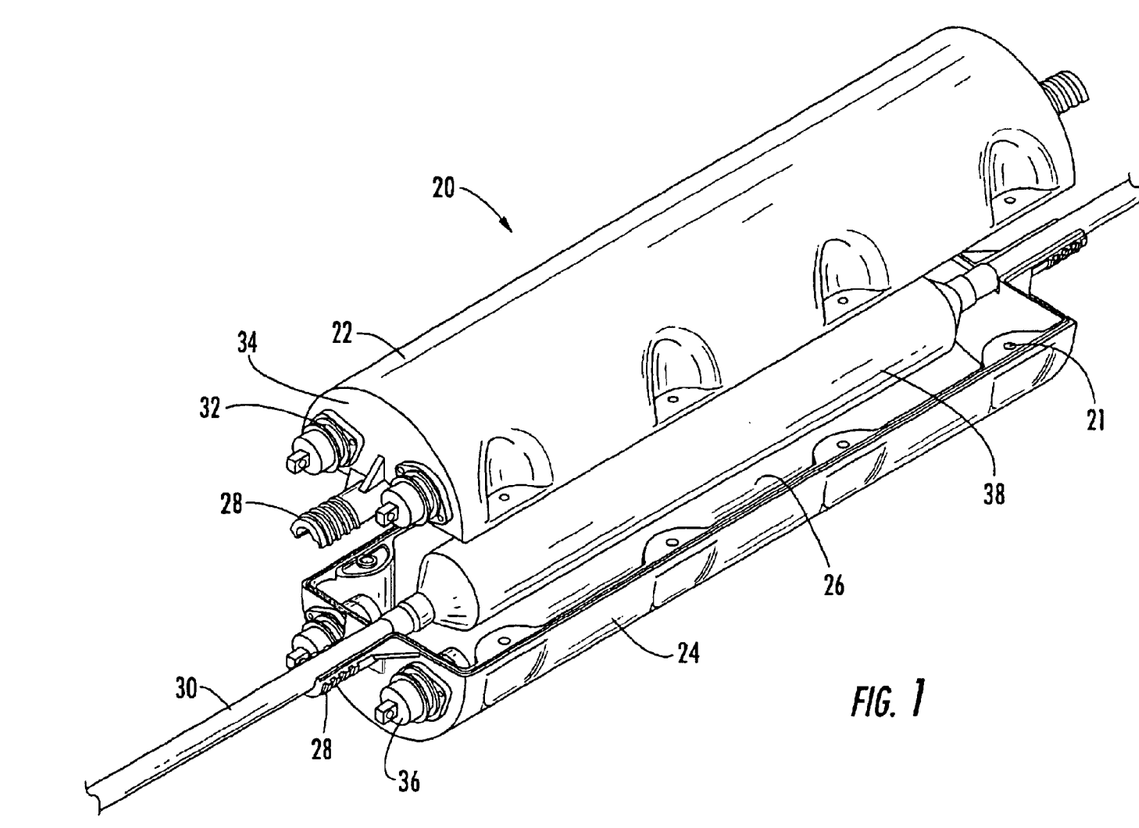
FIG. 1 is a perspective view of an interconnection enclosure having at least one connector port in accordance with an exemplary embodiment of the present invention.

FIG. 1 shows an example of an enclosure 20 comprises two substantially symmetrical halves 22, 24 held together by a fastening means including, but not limited to, screws, bolts, clamps, hooks or latches received through openings 21. Although not shown, a rubber gasket operable for providing a weatherproof seal may be disposed between the two halves 22, 24 in a groove or channel defined by the two halves 22, 24. The exemplary enclosure 20 has a generally cylindrical shape and defines a cavity 26 therein, hereinafter referred to as the "interior" of the enclosure 20. Although shown having a cylindrical shape, the enclosure may be of any size, shape or number of portions suitable for enclosing the access point and exposed buffer tubes. The region outside of the enclosure 20 is hereinafter referred to as the "exterior" of the enclosure 20. The enclosure 20 defines horizontal cable pathway features 28 that extend from the end walls of the enclosure 20 in the axial direction. A distribution cable 30 passes through and is routed by the horizontal cable pathway features 28. The enclosure 20 further defines at least one connector port 32 that opens through at least one end wall 34 of the enclosure 20. Although the enclosure 20 is shown having 4 connector ports 32 opening through only one housing or end wall 34, it is envisioned that any number of connector ports 32 may open through either or both end walls. The connector ports 32 are shown occupied by connector port covers 36.

Although not shown, when the enclosure 20 is installed and the two halves 22, 24 held together, a heat recoverable material, such as a heat shrink, may be placed over a portion of the enclosure horizontal cable pathway features 28 in order to provide a weather-proof seal at the locations where the distribution cable 30 enters and exits the enclosure 20. The heat shrink may further function to hold the two halves 22, 24 together and maintain the position of the enclosure 20 over an access point along the cable length. The hear shrink should substantially cover the horizontal cable pathway defining features 28 and a portion of the distribution cable 30. The "access point" is hereinafter defined as the point along the cable length at which the cable sheath has been removed to expose the underlying buffer tubes, thus permitting access to the buffer tubes encasing the optical fibers. The cable sheath may be removed by ring cutting or by any technique known to those skilled in the art.

The enclosure 20 may be factory or field-installed. In the case of field-installed applications, the distribution cable 30 may have a plurality of factory preterminated connectors encased by a heat recoverable material 38, such as a heat shrink material. For field installation of the enclosure, the heat shrink material may be removed to expose the access point along the cable length and the plurality of preterminated connectors. The enclosure 20 may then be installed over the access point and the preterminated connectors connected to their respective connector ports 32. In factory-installed applications, a distribution cable 30 may have a plurality of enclosures attached at predetermined locations along the cable length with the preterminated connectors already attached to their respective connector ports 32. In both applications, the preterminated connectors may be directly terminated or spliced, which is discussed below in greater detail. In both applications, the distribution cable 30, with or without the enclosures 20 attached at predetermined locations, may be rolled onto a reel for distribution.

Still referring to FIG. 1, the interior of the enclosure 20 is of a volume sufficient to house and handle the distribution cable 30, the accessed optical fibers, the preterminated connectors, a bend radius control means, optical fiber slack and splice holders that may be used with fusion splicing applications. Preferably, the enclosure 20 has a diameter just large enough to enclose the distribution cable, bend radius control means, optical fiber slack and sealing means. It is preferred that the enclosure 20 be long enough to completely encase the access point. The access point is preferably from about 1 to about 15 inches in length, or long enough to access at least 1 inch of optical fiber.

Figure 2A:
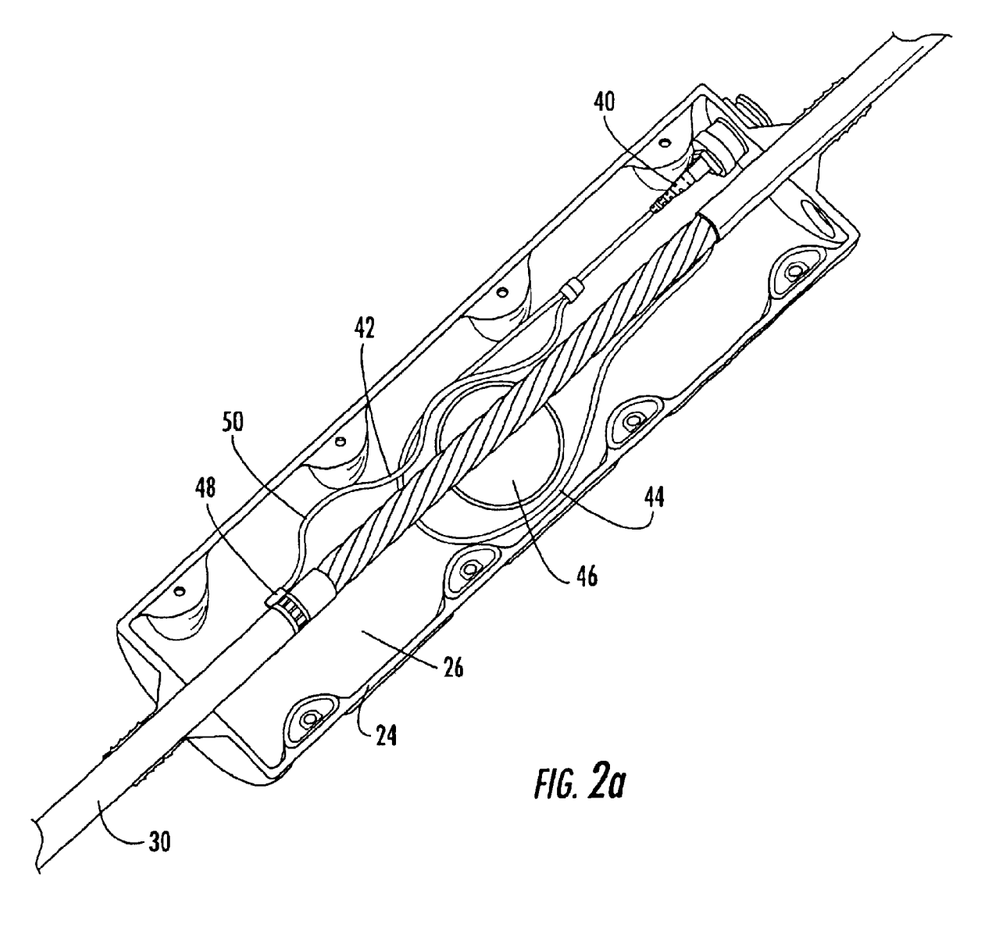
FIG. 2a is a perspective view of one half of an interconnection enclosure comprising a tether means and a direct terminated optical fiber having a preterminated connector in accordance with an exemplary embodiment of the present invention.

Referring to FIG. 2a, a factory-installed enclosure 20 is shown having a direct-terminated optical fiber 44 having a preterminated connector 40 and a tether means 42 for limiting the travel of the connector 40 exterior of the enclosure 20. The tether means 42 not only limits the amount of fiber 44 that can be removed from the enclosure 20, but facilitates its replacement at the end of the cleaning or servicing operation. This may require an elastic tether with a tensile element operable for preventing fiber extension beyond a predetermined point. The tether means 42 requires a structure inside the enclosure 20 that will allow the desired amount of fiber 44 to be withdrawn and reloaded without damage. The most simple tether embodiment may comprise an enclosure housing defining a cavity capable of containing the fiber 44 at both installed and extended positions. In this embodiment, the fiber 44 may be pulled from the enclosure 20 using minimal force, the connector assembly cleaned and serviced, then the tether pulls the connector assembly back into the housing. A more complicated approach may comprise a spring or elastomer element. In current practice, one relies on the skill of the field technician to not pull the connector 40 out of the enclosure 20 to a position where the fiber 44 is damaged. In a similar fashion, using current enclosure design, one also relies on the skill of the technician to get the fiber slack back into the enclosure 20 without damaging the fiber 44 or the contents of the enclosure 20.

The tether means 42 limits the travel of the preterminated connector 40 exterior of the enclosure 20. In FIG. 2a, in one embodiment, a hose clamp 48 and tether cord 50 secured to both the distribution cable 30 and the preterminated connector 40 are the tether means 42. The tether cord 50 may be an inelastic or elastic material with a predetermined maximum extension distance. The extension distance of the tether means 42 determines the extension distance of the preterminated connector 40 exterior of the enclosure 20. In the case of an elastic tether means 42, the elasticity may aid in the reloading of the preterminated connector 40 after it has been withdrawn from the enclosure interior 26. The extension distance of the preterminated connector 40 from the connector port 32 is preferably from about 1 to about 6 inches, and should not be less than about 1 inch. The extension distance should be adequate to allow access to the ferrule of the connector 40 for cleaning, polishing and replacing. The hose clamp 48 secured around the distribution cable sheath provides an adequately strong anchoring point for the tether cord 50. It is preferred that the hose clamp 48 be secured over the cable sheath so as not to damage the exposed buffer tubes. In an alternative embodiment, the tether means 42 may be secured at one end to the optical fiber 44, and secured at the other end to an interior surface of the enclosure housing.

The enclosure 20 is shown having a bend radius control means 46 secured to one half of the enclosure housing. The bend radius control means 46 is operable for maintaining a minimum bend radius, preferably greater than about 1.5 inches, of the optical fibers 44. The bend radius control means 46 shown in FIG. 2a has a cylindrical shape and may define grooves or channels on its outer surface which guides the optical fibers 44 around the outer surface. The preterminated connector 40 is shown connected to one of the connector ports 32 that open through the end wall 34 of the enclosure 20. Although not shown, a drop cable may be connected to the exterior side of the connector port 32, thus forming a preterminated connection. The drop cables do not enter the enclosure 20. The connector port 32 provides an adequately strong anchoring point for supporting the weight of the drop cable. The force applied to the connector port 32 from the weight of the drop cable is transferred from the connector port 32 to the enclosure 20 housing, which is secured by the distribution cable 30 and the heat shrink material secured around the pathway features 28 of the enclosure 20. The force from the weight of the drop cable is not transferred to the preterminated connector 40 of the optical fiber 44.

Figure 2B:
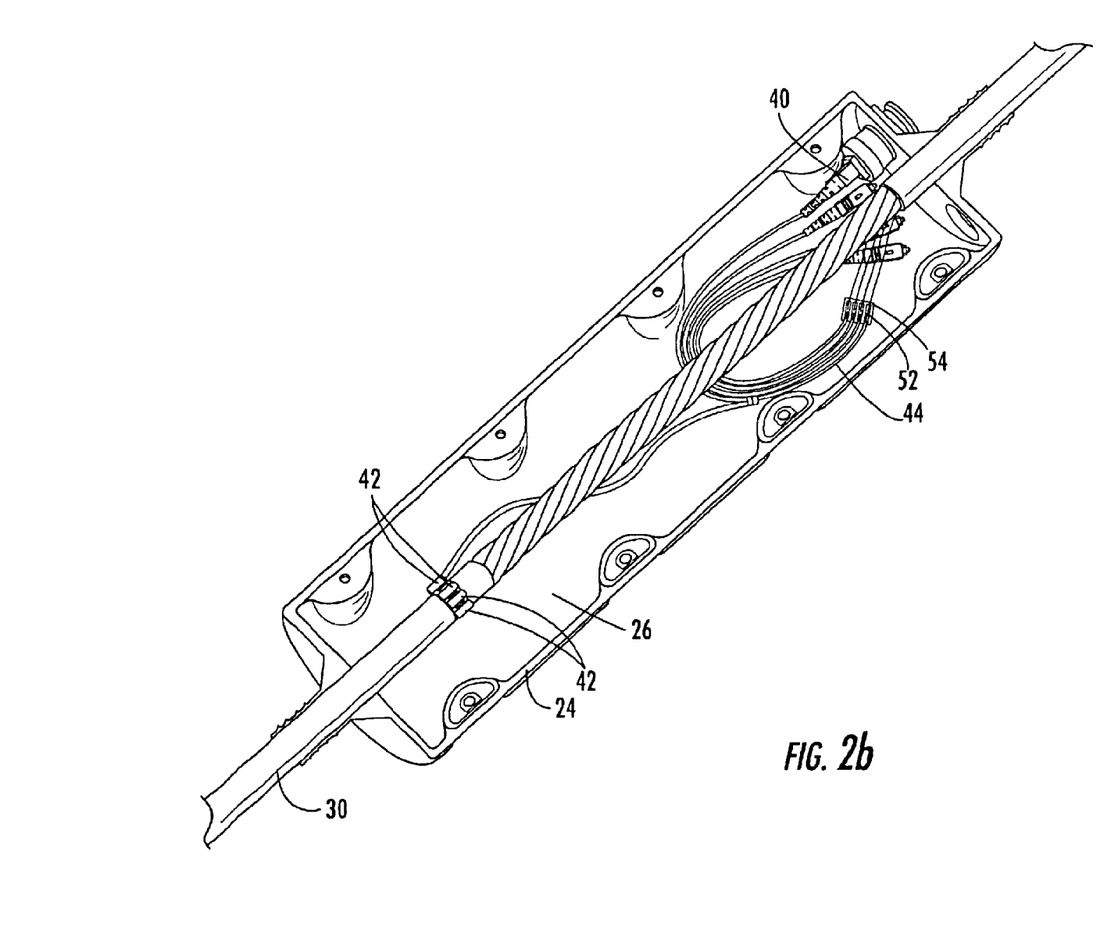
FIG. 2b is a perspective view of one half of an interconnection enclosure comprising a tether means and fusion-spliced optical fibers having preterminated connectors in accordance with an exemplary embodiment of the present invention.

Referring to FIG. 2b, a factory-installed enclosure 20 is shown having factory fusion-spliced optical fibers 44 having preterminated connectors 40 and a tether means 42 for limiting the travel of the connectors 40 exterior of the enclosure 20. The distribution cable 30 is shown having the optical fibers 44 fusion-spliced at a low-profile access point. Although 4 preterminated connectors 40 are shown, only one preterminated connector 40 is shown connected to the connector port 32 that opens through the end wall 34 of the enclosure 20. Although not shown, a drop cable may be connected to the exterior side of the connector port 32, thus forming a preterminated connection. Again, the drop cables attach on the exterior of the enclosure 20 and do not enter the enclosure 20. The connector port 32 provides an adequately strong anchoring point for supporting the weight of the drop cable. The tether means 42 limits the travel of the preterminated connectors 40 exterior of the enclosure 20.

The exemplary fusion-splice embodiment shown in FIG. 2b was prepared by the method described below. The fusion splice and method of producing the splice are not intended to limit the invention, but serve as one example in which the distribution cable may be accessed and factory preterminated. The distribution cable 30 shown is a single-mode 2–72 fiber cable with 6 positions for the helically s–z stranded buffer tubes. This exemplary cable comprises 12 optical fibers 44 per tube. The buffer tubes may be accessed by removing a substantial portion of the outer sheath encased by the enclosure 30, as described above. A predetermined branched buffer tube 46 may be accessed by ring cutting opposing ends and running the length of the tube with a blade that resides in a tool referred to as an "optical fiber access tool" ("OFAT"). The cut buffer portion may then be removed, exposing the 12 optical fibers 44. Each optical fiber 44 may be comprised of a core, cladding and a coating, having sizes of about 8 microns, 125 microns and 250 microns in diameter, respectively.

The exemplary splice shown illustrates the connectorization of 4 optical fibers 44 that connect to 4 connector ports 32. The 8 remaining unused optical fibers 44 may be removed. The optical fibers 44 may be cleaned and prepared for splicing. Each optical fiber 44 may be spliced together with a pre-connectorized "pigtail" into 4 pairs using a fusion splicer. A reinforced splice protector 52 for splice protection may be slid into the correct position, centered over the spliced intersection and shrunk permanently into place. The splice points may be held in place using a splice holder 54, such as a rubber or plastic material defining channels or grooves operable for holding a splice protector 52 in place. The splice holder 54 may be secured to an interior surface of the enclosure housing or to the distribution cable 30.

Still referring to FIG. 2b, the tether cord 50 may be fixably attached to the optical fiber 44 and secured to either the distribution cable 30 or to an interior surface of the enclosure 20. The position of the hose clamp 48 and the length of the tether cord 50 determine the maximum extension distance of the connectors 40 exterior of the enclosure 20. The extension distance of the preterminated connector 40 from the connector port 32 is preferably from about 1 to about 6 inches, and should not be less than about 1 inch. The extension distance should be adequate to allow access to the ferrule of the connector 40 for cleaning, polishing, repairing and replacing. The hose clamp 48 tethered to either the distribution cable 30 or to an interior surface of the enclosure 20 provides an adequately strong anchoring point for the connectors 40 of the optical fibers 44.

Figure 3A:
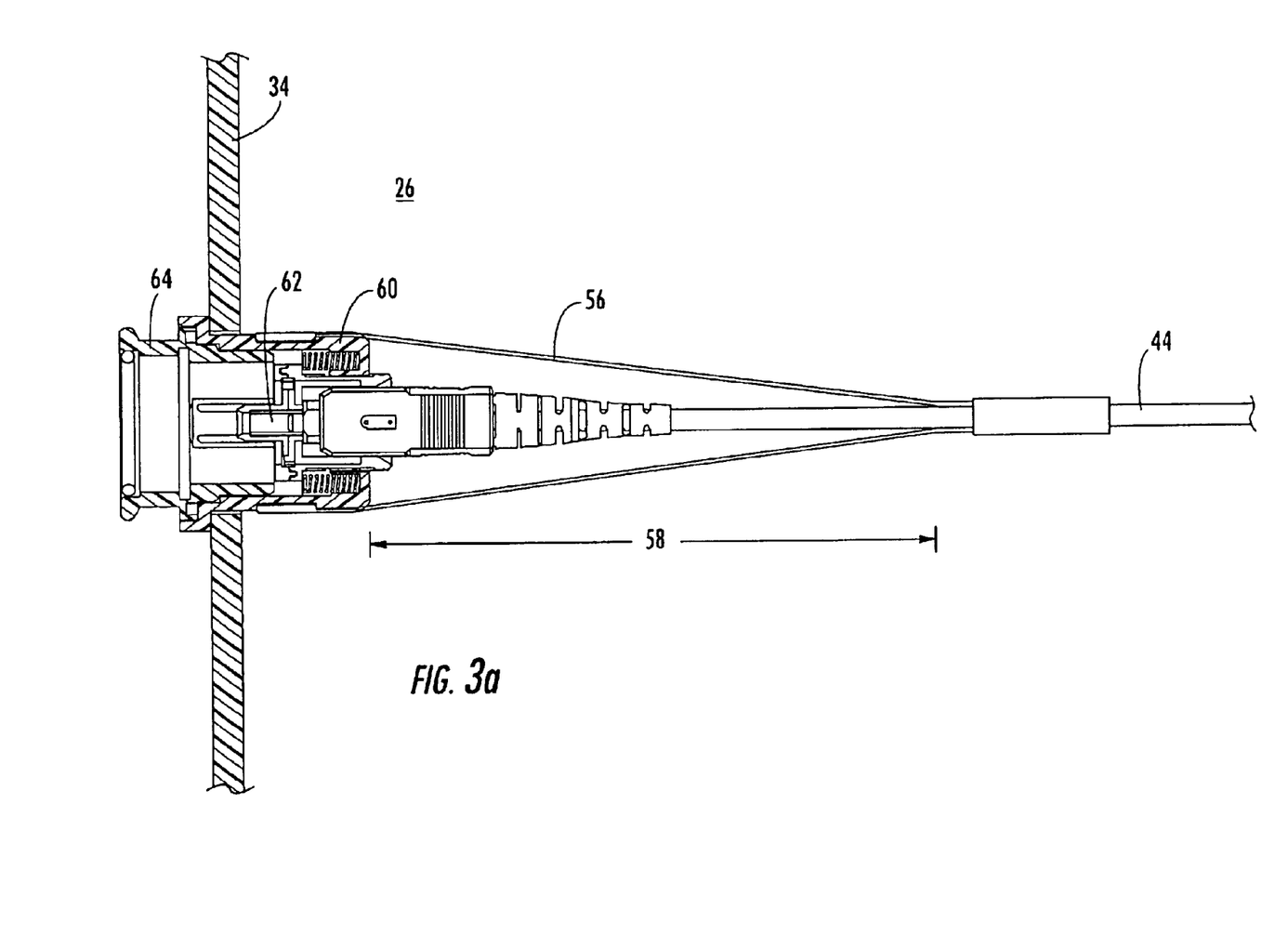
FIG. 3a is a cross-sectional view of a preterminated connector, a connector port cover and a connector sealing means in a retraced position in accordance with an exemplary embodiment of the present invention.

Referring to FIG. 3a, a sealing means, such as an invertable sealing boot 56 may simultaneously act to seal the backside of the connector port 32 and provide over-travel prevention capability. The sealing boot 56 in FIG. 3a is shown in a retracted position in which the preterminated connector 40 is disposed in the interior 26 of the enclosure 20. The length of the sealing boot 56 determines an extension distance 58 of the connector 40 exterior of the enclosure 30. The sealing function of the sealing boot 56 protects the preterminated connection while allowing the rest of the enclosure 20 to remain unsealed. By using individual boot seals for each preterminated connection, it is insured that the sealing of other connectors 40 within the enclosure 20 are not affected while one connection is attended to. The sealing boot 56 may be secured to its respective optical fiber 44 using a heat shrink, clamp, strap or other fastening mechanism. The sealing boot 56 may be connected at its other end to a connector port receptacle 60 using a clamp, strap, interference fit or other fastening mechanism. When withdrawing the connector 40 from the interior of the enclosure 20, the sealing boot 56 inverts upon itself as fiber slack is pulled from the enclosure 20. As the connector 40 is reloaded into the interior of the enclosure 20, the sealing boot 56 reverts back to its original shape. The sealing boot 56 should maintain its elastic properties over a wide temperature range, such as from about −40° C. to about 85° C.

Still referring to FIG. 3a, the preterminated connector 40 is connected to an adapter sleeve 62 that resides within the receptacle 60 secured to the connector port 32. The adapter sleeve 62 may be biased in the direction of the end wall 34 of the enclosure 20 and brings the ferrule of the preterminated connector 40 into contact with the ferrule of an attached drop cable. A receptacle cap 64 fits securely within the receptacle 60 and is operable for holding the adapter sleeve 62 within the receptacle 60. The receptacle cap 64 preferably engages the receptacle 60 using a snap-fit design, but may comprise a screw-fit, bayonet-fit or any other interference-fit design. Although not shown, a removable connector port cover 36 occupies the connector port 40 when a drop cable is not attached to the exterior surface of the adapter sleeve 62. The connector port cover 36 may be secured using a snap-fit, screw-fit, bayonet-fit or any other interference-fit design.

Figure 3B:
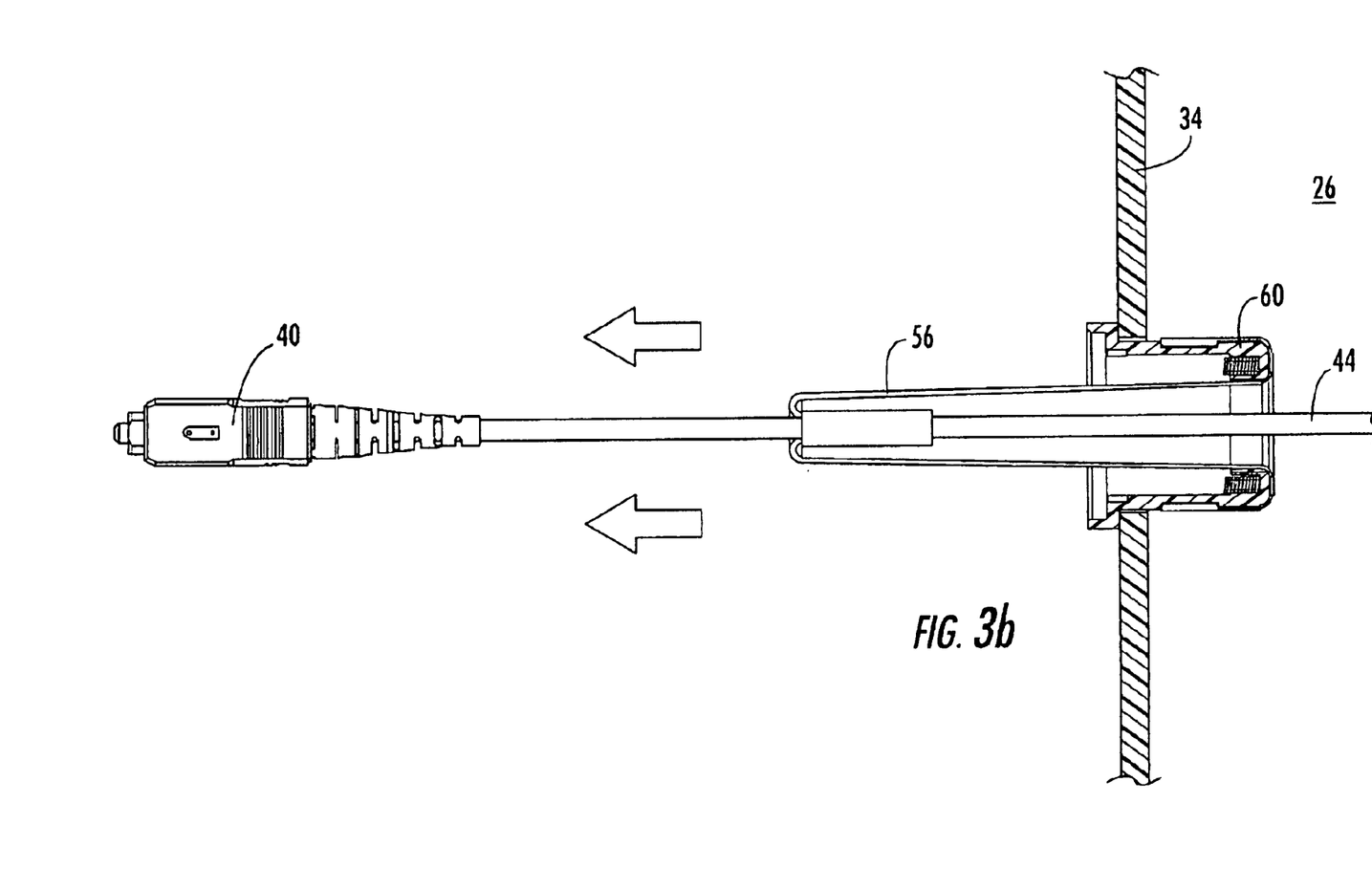
FIG. 3b is a cross-sectional view of the preterminated connector and connector sealing means of FIG. 3a in an extended position, wherein the connector port cover and the adapter sleeve are removed in accordance with an exemplary embodiment of: the present invention.

Referring to FIG. 3b, the sealing boot 56 is shown in an extended position in which the preterminated connector 40 is exterior of the enclosure 20. In this illustration, the connector port cover 36, the receptacle cap 64 and the adapter sleeve 62 have been removed and are not shown. The sealing boot 56 simultaneously acts to seal the backside of the connector port 32 and provides the over-travel prevention capability. A drop cable comprising a similar sealing boot 56 may be connected to the exterior side of the adapter sleeve 62 to seal the preterminated connection. The preterminated connector 40 is exterior of the enclosure 20 a distance determined by the length of the sealing boot extension distance 58. The extension distance provides access to the connector 40 from the exterior of the enclosure 20 without having to enter the enclosure 20. As stated above, the sealing boot 56 is secured to its respective optical fiber 44 and the connector port receptacle 60. The sealing boot 56 will revert to its retracted configuration when the preterminated connector 40 is reloaded into the enclosure 20. Although the sealing boot 56 is shown extended beyond the exterior surface of the connector port 32, in an alternative embodiment, when inverted the sealing boot 56 may not be extended beyond the exterior surface so as not to damage the sealing boot 56 or pull it off of the receptacle 60.

Figure 4A:
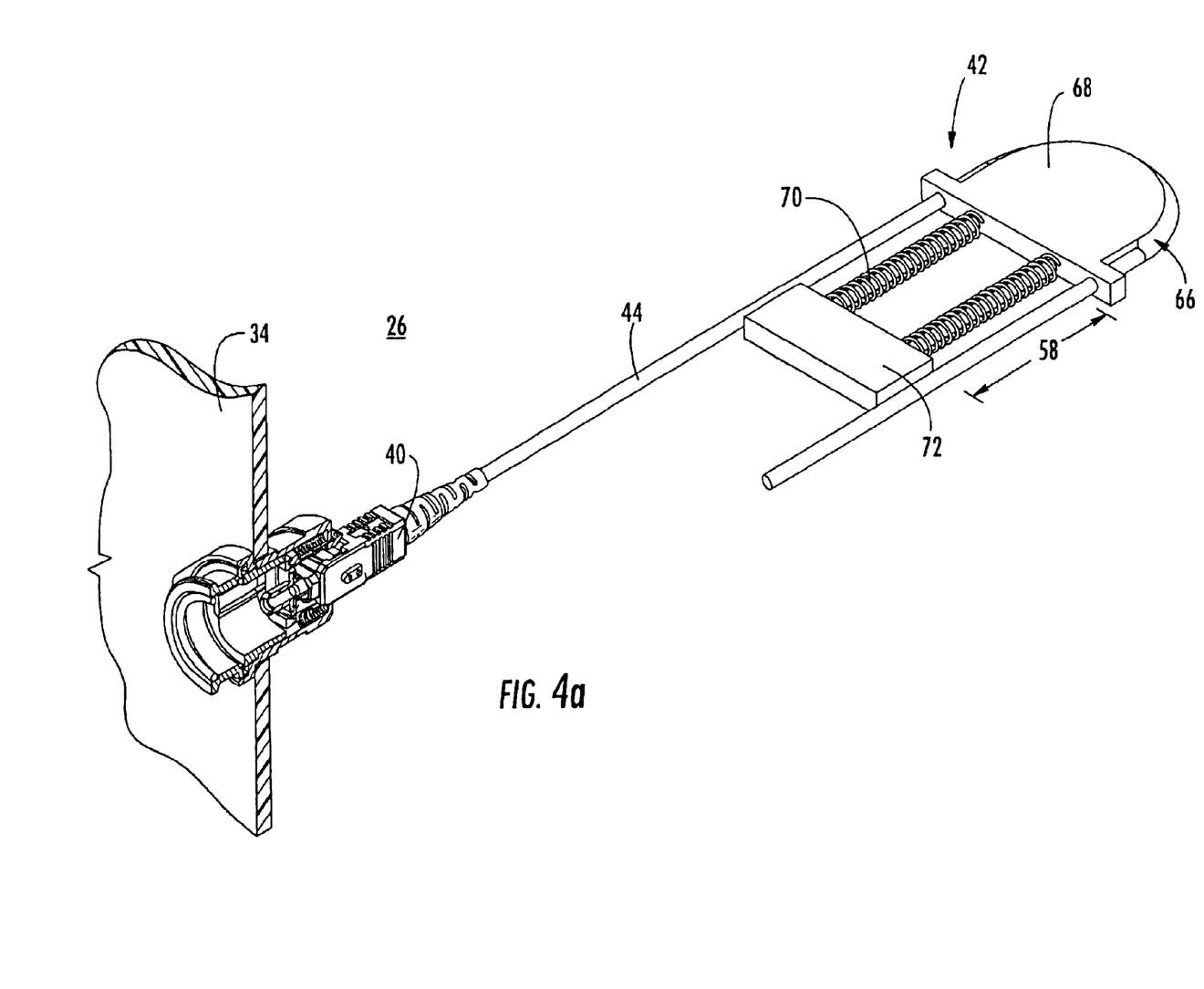
FIG. 4a is a perspective view of a tether means with bend radius control in a retracted position in accordance with an exemplary embodiment of the present invention.

Referring to FIG. 4a, another embodiment of a tether means 42 and a bend radius control means 46 is shown for accessing a preterminated connector 40 from the exterior of an enclosure 20. Although not shown, the sealing means illustrated in FIGS. 3a and 3b may be used with the tether and bend radius control design of FIGS. 4a and 4b. The sealing boot 56 may simultaneously act to seal the backside of the connector port 32 and provide optical fiber 44 over-travel prevention capability. In an alternative embodiment, a hardened connector with a sealing means, such as an o-ring, may be disposed between the exterior surface of the connector and the interior surface of the adapter sleeve 62. To seal the preterminated connection on the exterior side of the adapter sleeve 62, a sealing means, such as an o-ring, may be disposed between the exterior surface of the adapter sleeve 62 and a connector of a drop cable. The sealing boot 56 may be used alone or in combination with the o-ring sealing means.

Figure 4B:
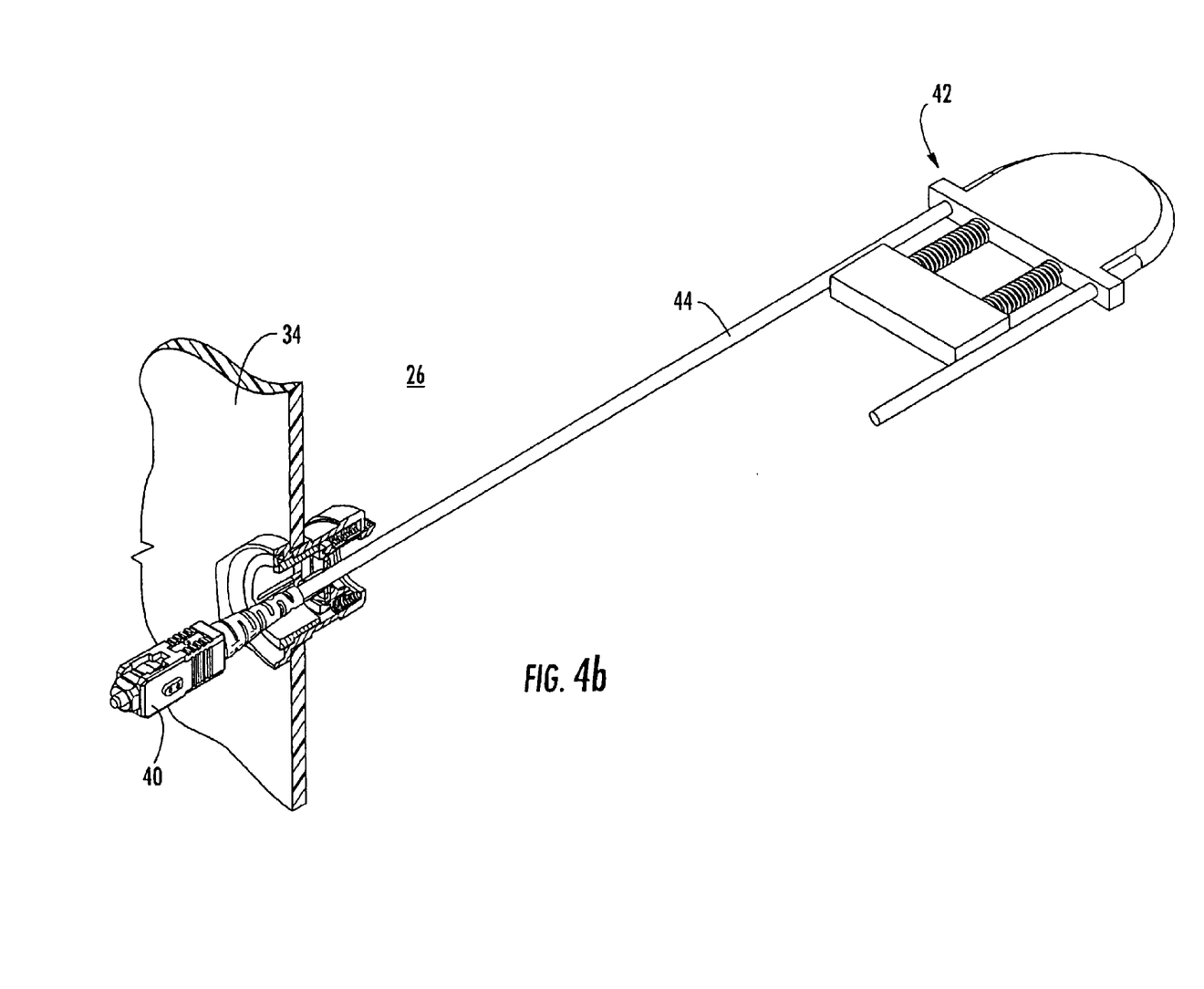
FIG. 4b is a perspective view of the tether means with bend radius control of FIG. 4a in an extended position in accordance with an exemplary embodiment of the present invention.

The preterminated connector 40 in FIG. 4a is shown in a retracted position within the interior 26 of the enclosure 20. A spring-loaded tether means 42 may be used to provide tether and bend radius control functions. In addition, in tightly constrained spaces the spring may function as a means of pulling the connector 40 back into the enclosure 20 in the desired orientation. In enclosures 20 having a large interior, the means for pulling the connector 40 back into the enclosure 20 may not be needed. An optical fiber 44 may be routed by a frictionless groove 66 defined by a first semicircular portion 68 of the tether means 42. One or more helical springs 70 disposed between the first portion 68 and a second portion 72 of the tether means 42 may be operable for providing tension between the two portions. Referring to FIG. 4b, when the connector 40 is withdrawn from the interior of the enclosure 30, the springs 70 compress and the optical fiber 44 slides along the outer surface of the first portion 68. Referring to FIG. 4a, when the connector 40 is reloaded into the interior of the enclosure 20, the springs provide a tension force for reloading the optical fiber slack. The length of the springs 70 and the amount that they can be compressed determines the extension distance 58 of the connector 40 exterior of the enclosure 30. The sealing boot 56, if used, may also determine the extension distance 58. The tether means 42 may be secured to the distribution cable 30 or to an interior surface of the enclosure 20 using any fastening means.

Figure 5A:
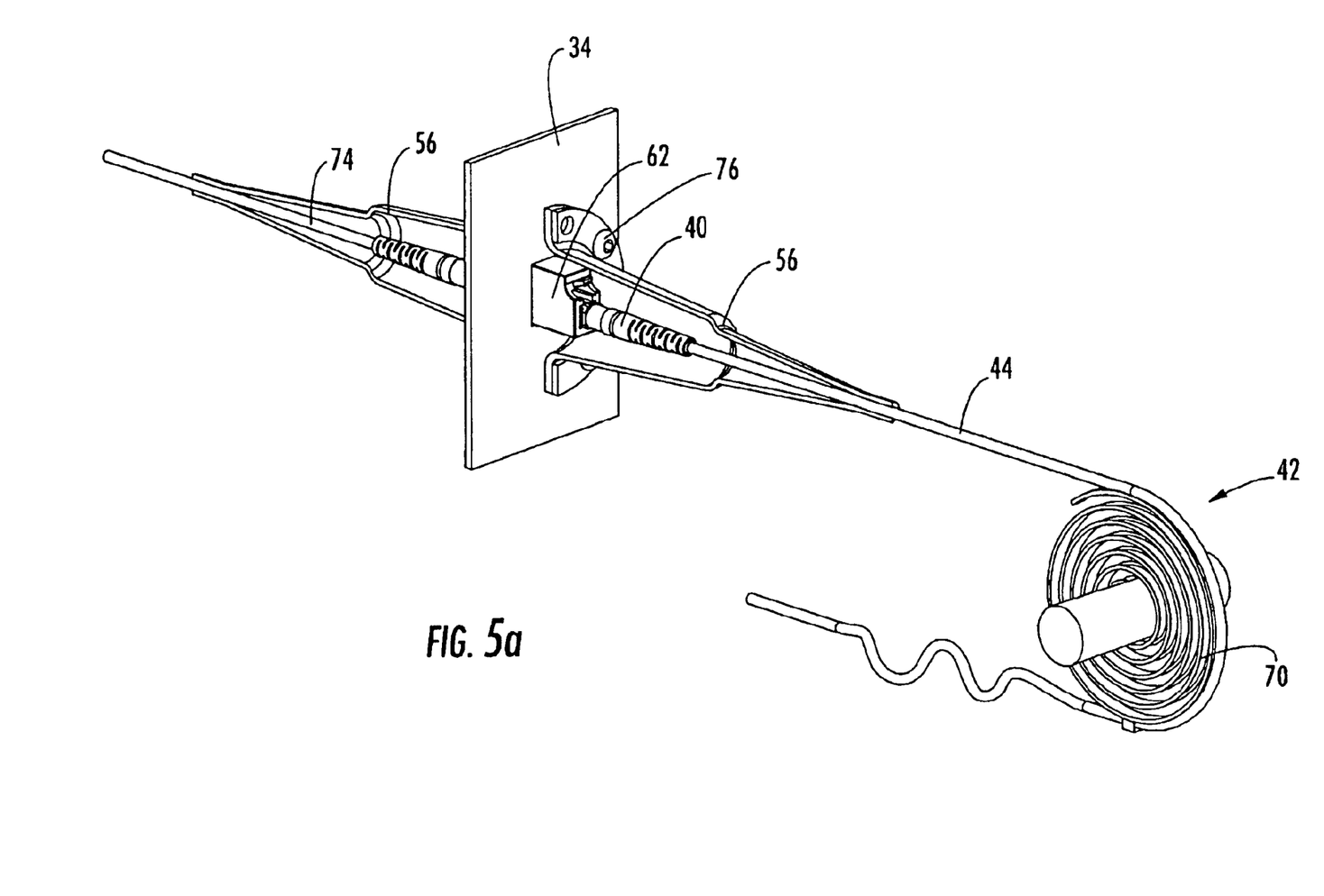
FIG. 5a is a perspective view of an assembled and retracted preterminated connection comprising an adapter sleeve, a sealing means and a tether means in accordance with an exemplary embodiment of the present invention.

FIG. 5a shows an assembled view of another embodiment of a tether and bend radius control means 42 for accessing a preterminated connector 40 from the exterior of an enclosure 20. An adapter sleeve 62 disposed within the connector port 32 is connected to both the preterminated connector 40 and a drop cable 74. Sealing boots 56 are removably attached to the optical fibers 44 and the end wall 34 of the enclosure on both the preterminated connector 40 side and on the drop cable side to seal the preterminated connection. The sealing boots 56 may be attached to the end wall 34 using a fastening means including, but not limited to, screws 76 or snaps. As stated above, the sealing boot 56 may simultaneously act to seal the connector port 32 and provide optical fiber 44 over-travel prevention capability. In an alternative embodiment, an additional sealing means, such as an o-ring, may be disposed between the exterior surface of the connector and the interior surface of the adapter sleeve 62. To further seal the preterminated connection on the exterior side of the adapter sleeve 62, a sealing means, such as an o-ring, may be disposed between the exterior surface of the adapter sleeve 62 and the connector of the drop cable. The preterminated connector 40 in FIG. 5a is shown in a retracted position within the interior 26 of the enclosure 20. A spring-loaded tether means 42 may be used to provide tether, bend radius control and connector retraction functions. The optical fiber 44 travels around the exterior of the coil spring 70 when slack is withdrawn or reloaded. The spring 70 is fixed to an interior surface of the enclosure 20 or to the distribution cable 30.

Figure 5B:
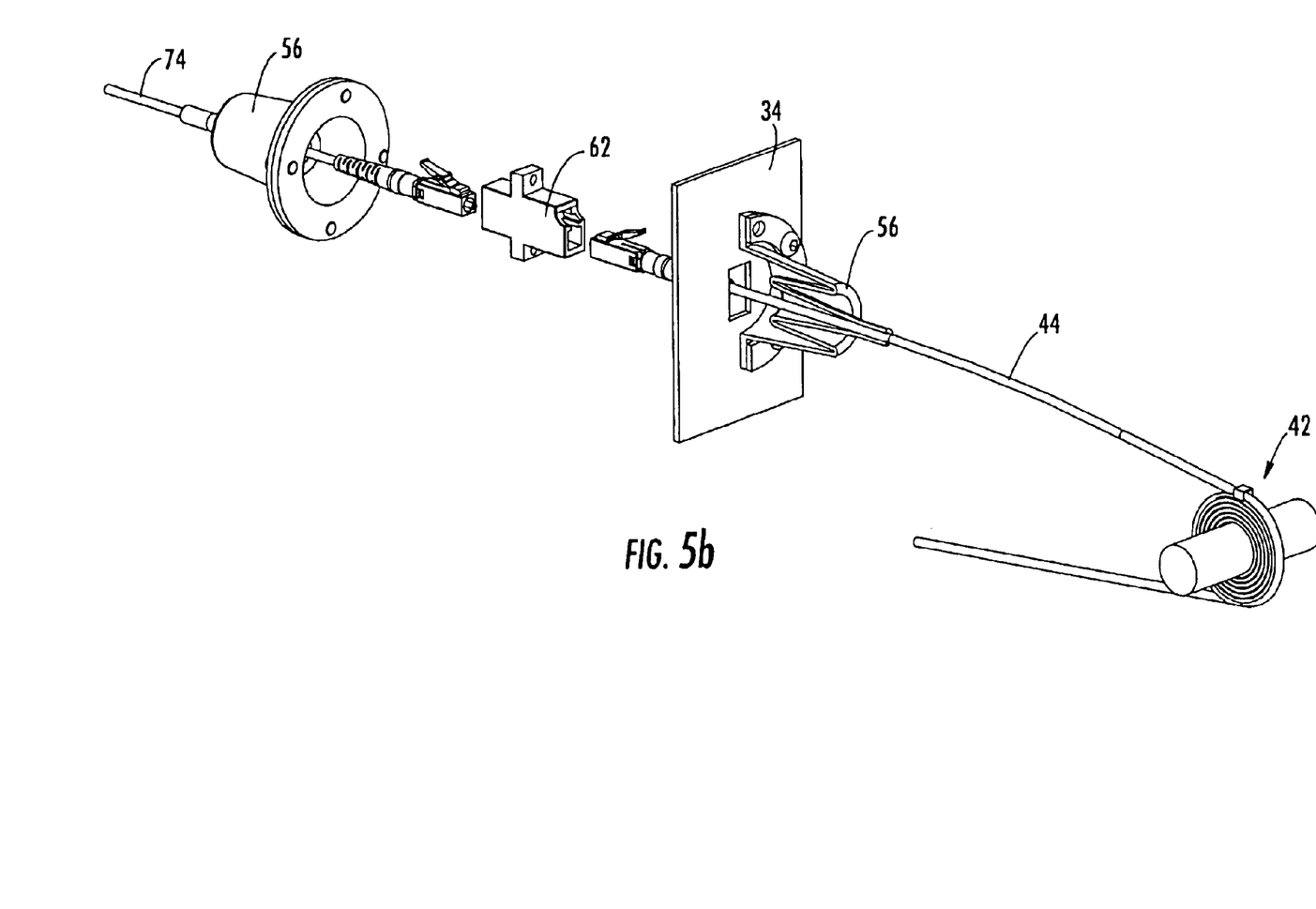
FIG. 5b is a perspective view of the preterminated connection of FIG. 5a in a disassembled and extended position in accordance with an exemplary embodiment of the present invention.

FIG. 5b shows the preterminated connection of FIG. 5a in a disassembled and extended position. When the connector 40 is withdrawn from the interior of the enclosure 30, the spring 70 compresses and the optical fiber 44 slides along the outer surface of the spring 70. In order to withdraw the connector 40, the drop cable 74 and the adapter sleeve 62 are detached from the end wall 34. In one example, the adapter sleeve 62 may be attached to the exterior surface of the end wall 34 using screws. The drop cable and preterminated connectors 40 may be accessed for cleaning by inverting the sealing boot 56 upon itself and exposing the connectors. The length of the spring 70 and the amount that it can be coiled determines the extension distance 58 of the connector 40 exterior of the enclosure 30. The sealing boot 56 may also determine the extension distance 58. The spring 70 should not compress to a diameter smaller than the minimum bend radius of the optical fiber 44.

Figure 6:
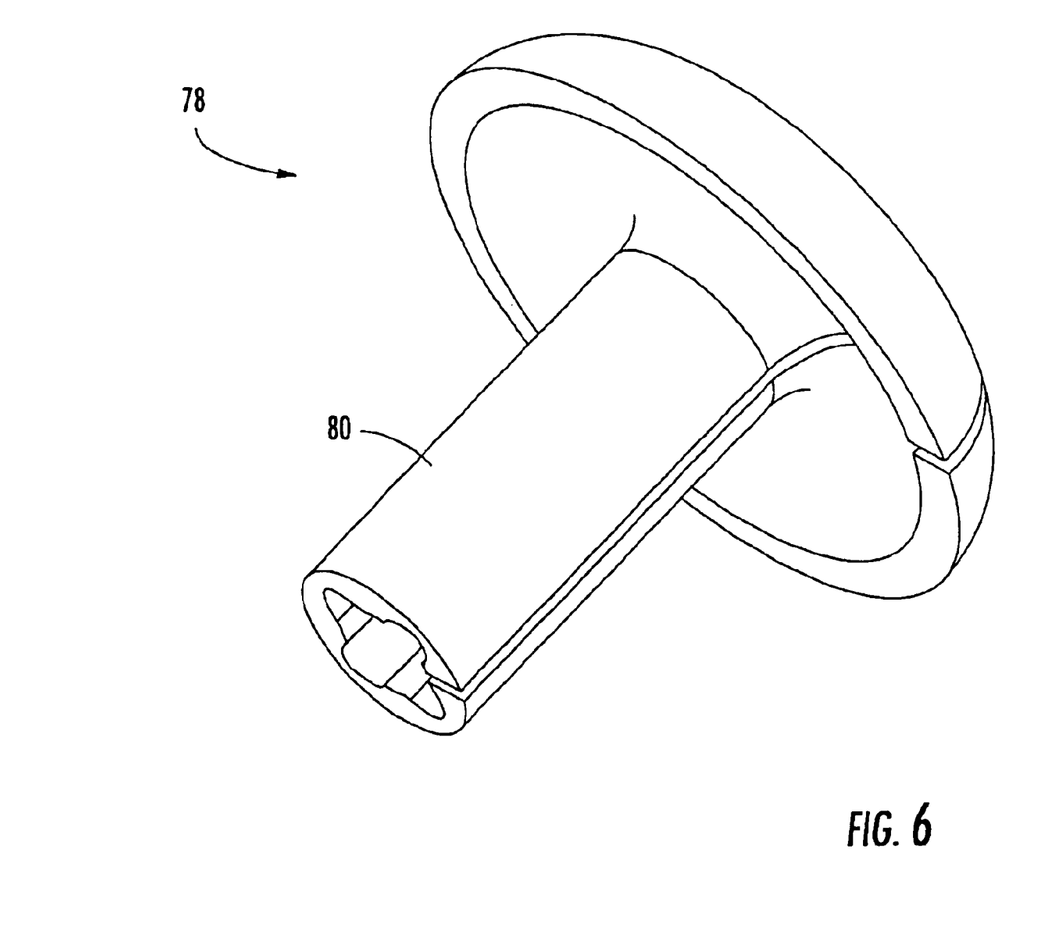
FIG. 6 is a perspective view of a bend radius control apparatus in accordance with an exemplary embodiment of the present invention.

Referring to FIG. 6, an alternative embodiment of an apparatus for bend radius control is shown. A "mushroom" shaped apparatus 78 may be secured around the distribution cable 30 at the predetermined branch position along the cable length. The branched optical fibers 44 are routed over the surface of the cap-portion to their respective connector ports 32. The bend-limiting apparatus may be factory or field-installed. Further, the apparatus may comprise a spring 70 disposed between the apparatus shaft 80 and the distribution cable 30, and fixed to the distribution cable 30. The spring 70 provides a tether and a slack reloading function. The shaft 80 may define grooves operable for channeling the optical fibers 44 along the distribution cable 30.

Figure 7:
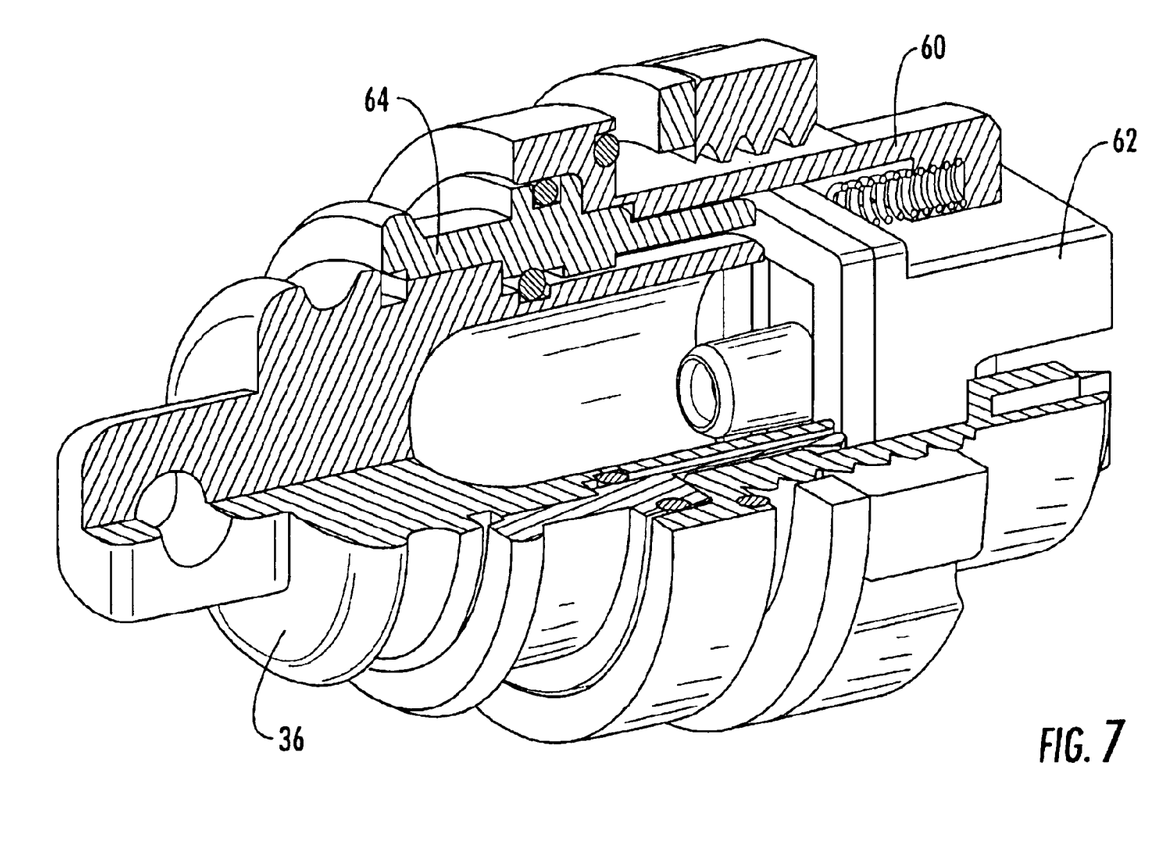
FIG. 7 is a perspective view of a preterminated connector and receptacle assembly in accordance with an exemplary embodiment of the present invention.

FIG. 7 shows a specific embodiment of a receptacle assembly that resides within the connector port 32. The receptacle 60 is fixed to the end wall 34 of the enclosure 20. The adapter sleeve 62 resides within the receptacle 60 and is biased in the direction of the end wall 34 of the enclosure 20. The adapter sleeve 62 and the preterminated connector 40 are accessible from the exterior of the enclosure 20. The adapter sleeve 62 is held in place by the receptacle cap 64 that fits securely within the receptacle 60. The receptacle cap 64 preferably engages the receptacle 60 using a snap-fit design, but may comprise a screw-fit, bayonet-fit or any other interference-fit design. The removable connector port cover 36 occupies the connector port 40 when a drop cable is not attached to the exterior surface of the adapter sleeve 62. The connector port cover 36 may be secured using a snap-fit, screw-fit, bayonet-fit or any other interference-fit design. The specific embodiment shown in FIG. 7 is just one example of an assembly for connecting a preterminated connector pair, it is envisioned that other assemblies may perform similar functions.

The foregoing is a description of various embodiments of the invention that are given here by way of example only.

Although the optical fiber enclosures 20 and related apparatus have been described with reference to preferred embodiments and examples thereof, other embodiments and examples may perform similar functions and/or achieve similar results. All such equivalent embodiments and examples are within the spirit and scope of the present invention and are intended to be covered by the following claims.

What is claimed is:

1. An interconnection enclosure comprising at least one housing wall separating an interior of the enclosure from an exterior of the enclosure, the housing wall having an opening therethrough, the enclosure comprising:

at least one connector port positioned within the opening of the housing wall and operable for receiving a preterminated optical connector from the interior of the enclosure;

the preterminated optical connector attached to an optical fiber that is optically connected to a distribution cable; and a tether means within the interior of the enclosure;

wherein the preterminated optical connector is adapted to be withdrawn from the enclosure without entering the enclosure and the tether is operable for limiting an extension distance of the preterminated optical connector withdrawn from the enclosure.

2. The interconnection enclosure of claim 1, further comprising a bend radius control means for maintaining a minimum bend radius of the optical fiber.

3. The interconnection enclosure of claim 1, further comprising a sealing means operable for sealing the at least one connector port.

4. The interconnection enclosure of claim 3, wherein the sealing means is an invertable rubber boot operable for providing a sealing function and a tether function.

5. The interconnection enclosure of claim 1, wherein the connector port comprises a receptacle fixably attached to the housing wall, a removable receptacle cap positioned within the receptacle, a removable receptacle cap cover and a removable adapter sleeve, wherein the adapter sleeve is removable from the connector port through the housing wall of the enclosure without entering the enclosure.

6. The interconnection enclosure of claim 1, wherein the enclosure is operable for enclosing at least one of direct-terminated optical fibers and fusion-spliced optical fibers.

7. The interconnection enclosure of claim 1, wherein the enclosure is factory-installed or field-installed.

8. An interconnection enclosure, comprising:

an enclosure housing comprising two housing halves held together by a fastening means, the enclosure housing defining an end wall and defining at least one connector port opening through the end wall for receiving a preterminated optical connector, the enclosure housing further defining an opening for receiving a distribution cable extending therethrough; and a tether means within the enclosure operable for limiting an extension distance of the preterminated optical connector exterior of the enclosure;

wherein the preterminated optical connector is adapted to be withdrawn from the enclosure without entering the enclosure.

9. The interconnection enclosure of claim 8, further comprising a sealing means within the enclosure operable for sealing the at least one connector port.

10. The interconnection enclosure of claim 9, wherein the sealing means is an invertable rubber boot operable for providing a sealing function and a tether function.

11. The interconnection enclosure of claim 8, further comprising a bend radius control means for maintaining a minimum bend radius of preterminated optical fibers.

12. The interconnection enclosure of claim 8, wherein the connector port comprises a receptacle fixably attached to the enclosure end wall, a removable receptacle cap within the receptacle, a removable receptacle cap cover and a removable adapter sleeve, wherein the adapter sleeve is removable from the receptacle from the exterior of the enclosure without entering the enclosure.

13. The interconnection enclosure of claim 8, wherein the enclosure is factory-installed or field-installed.

14. A preterminated fiber optic connection, comprising:

an access point located at a predetermined position on a distribution cable comprising a plurality of optical fibers;

at least one optical fiber of the distribution cable branched from the distribution cable at the access point;

a preterminated optical connector attached to the at least one optical fiber;

an enclosure forming a cavity therein and defining a passage for the distribution cable extending therethrough, the enclosure further defining at least one connector port opening through at least one end wall of the enclosure;

a tethering means; and a bend radius control means;

wherein the preterminated optical connector is adapted to be withdrawn from the exterior of the enclosure without entering the enclosure.

15. The preterminated connection of claim 14, further comprising a sealing means within the enclosure operable for sealing the at least one connector port.

16. The preterminated connection of claim 15, wherein the sealing means is an invertable rubber boot.

* * * * *